United States Patent
Steinmann et al.

(10) Patent No.: US 7,856,428 B2
(45) Date of Patent: Dec. 21, 2010

(54) METHOD, COMPUTER PROGRAM PRODUCT AND DEVICE FOR IMPORTING A PLURALITY OF DATA SETS INTO A SYSTEM

(75) Inventors: Joerg Steinmann, Voelkllngen (DE); Karthikeyan A., Bangalore (IN); Himanshu Kacker, Bangalore (IN); Mohan Marar, Bangalore (IN); Jayanta M. Boruah, Bangalore (IN); Wolfgang Gentes, Zwelbruecken (DE)

(73) Assignee: SAP AG, Walldorf ( * ) Notice: Subject to any disclaimer, the term of this patent is extended or adjusted under 35 U.S.C. 154(b) by 800 days.

(21) Appl. No.: 11/114,897

(22) Filed: Apr. 26, 2005

(65) Prior Publication Data
US 2005/0240562 A1 Oct. 27, 2005

(30) Foreign Application Priority Data
Apr. 26, 2004 (EP) .................................. 04009849

(51) Int. Cl.
*G06F 7/00* (2006.01)
*G06F 17/30* (2006.01)
(52) U.S. Cl. .......................... 707/705; 707/736; 707/758
(58) Field of Classification Search ............... 707/1–10, 707/100–104.1, 200–206, 600–831
See application file for complete search history.

(56) References Cited

U.S. PATENT DOCUMENTS

| 5,689,699 A | 11/1997 | Howell et al. |
| 5,761,667 A | 6/1998 | Koeppen |
| 5,845,281 A | 12/1998 | Benson et al. |
| 6,128,617 A | 10/2000 | Lowry |
| 6,199,082 B1 * | 3/2001 | Ferrel et al. .................. 715/522 |
| 2002/0046248 A1 * | 4/2002 | Drexler ....................... 709/206 |
| 2002/0056075 A1 | 5/2002 | Hamilton et al. |
| 2002/0184609 A1 | 12/2002 | Sells et al. |
| 2002/0194196 A1 | 12/2002 | Weinberg et al. |
| 2002/0194227 A1 * | 12/2002 | Day et al. .................... 707/523 |
| 2003/0004945 A1 | 1/2003 | Teng et al. |

(Continued)

FOREIGN PATENT DOCUMENTS

DE 100 63412 7/2001

(Continued)

OTHER PUBLICATIONS

Alan Simpson et al, Mastering Access 97, Sybex 1997, p. 1015.*

(Continued)

*Primary Examiner*—Jean B Fleurantin
(74) *Attorney, Agent, or Firm*—Fish & Richardson P.C.

(57) ABSTRACT

A method for importing a plurality of data sets into a system, each data set comprising data segments separated by a separator, the method comprising the steps of: providing data sets to be imported on a data storage medium, reading the data sets from the data storage medium, storing the data sets in a first table in the system, substantially without processing the data sets, reading the stored data sets from the first table, and writing one or more data segments of each data set into sub-tables, each sub-table comprising at least one data field. Furthermore, it is disclosed a computer program product and a device for importing a plurality of data sets into a system.

10 Claims, 13 Drawing Sheets

U.S. PATENT DOCUMENTS

2003/0182298 A1* 9/2003 Kalthoff et al. ............. 707/101
2004/0039741 A1 2/2004 Urich et al.

FOREIGN PATENT DOCUMENTS

| EP | 0458179 | 11/1991 |
|---|---|---|
| EP | 1217540 | 6/2002 |
| WO | 03/012611 | 2/2003 |

OTHER PUBLICATIONS

Yue Zhuge et al., View maintenance in a warehousing environment, 1995, ACM, 316-327.*

Jennifer Widom, Research problems in data warehousing, 1995, ACM, 25-30.*

Yue Zhuge et al., View maintenance in a warehousing environment, 1995, ACM, 316-327.*

Jennifer Widom, Research problems in data warehousing, 1995, ACM, 25-30.*

Manish Mehta et al., Data placement in shared-nothing parallel database systems, 1997, ACM, vol. 6, 53-72.*

Chaudhuri, Surajit, et al, "An Overview of Data Warehousing and OLAP Technology," *SIGMOD Record*, SIGMOD, New York, USA, vol. 26, No. 1, Mar. 1997, pp. 65-74, XP002193792.

Squire, Cass, "Data Extraction and Transformation for the Data Warehouse," *ACM Proceedings of SIGMOD, International Conference on Management of Data*, vol. 24, No. 1, Mar. 1, 1995, pp. 446-447, XP002091745.

White, Colin, "Data Warehousing: Cleaning and Transforming Data," INFO DB, Iowa City, USA, vol. 10, No. 6, Apr. 6, 1997, pp. 11-12, XP002091743.

White, Colin, "Managing Data Transformations," *Byte*, McGraw-Hill Inc., St. Petersborough, USA, Dec. 1, 1997, pp. 53-54, XP000728707.

Rahm, Erhard. "Parallel Query Processing in Shared Disk Database System." University of Kaiserslautern, Germany, *Sigmod Record*, vol. 22 (4): 32-37 (1993).

Harder and Rothermel. "Concurrency Control Issues in Nested Transactions." University of Kaiserslautern, Germany, VLDB Journal, vol. 2 (1):39-74 (1993).

* cited by examiner

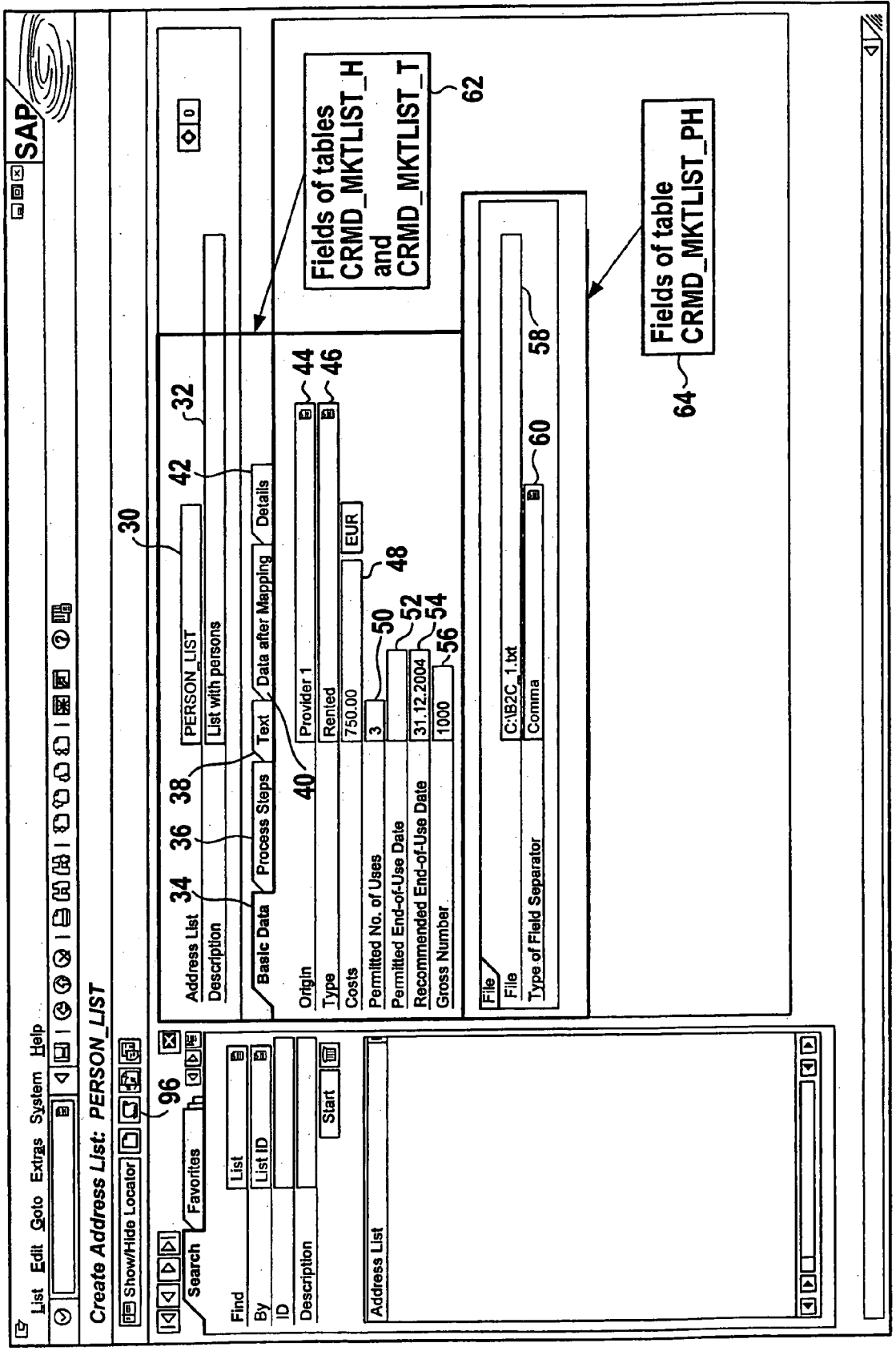

FIG. 3E

| | | Process Steps Log | ☒ |
|---|---|---|---|
| ⚭ | 🛑0 ☐1 △0 ○6 ☒ | | |

| Type | Message Text |
|---|---|
| ○ | 10 records uploaded succesfully |
| ○ | Step Upload File started at 29 January 2004 09:29:40 (UTC) ended at 29 January 2004 09:29:40 (UTC) |
| ○ | 10 records mapped succesfully |
| ○ | Step Map Data started at 29 January 2004 09:29:41 (UTC) ended at 29 January 2004 09:29:41 (UTC) |
| ☐ | 5 Business Partners created |
| ○ | 5 errors while creating Business Partners |
| ○ | Step Business Partner Creation started at 29 January 2004 09:29:42 (UTC) ended at 29 January 2004 09:29:46 (UTC) |

Error Analysis of Step Business Partner Creation

Start Position: 1

| Record Number | Record No | Field No | Msg type | Long Text | Error Msg | Data Rec |
|---|---|---|---|---|---|---|
| 1 | 0 | 0 | | | | Mr., Jame... |
| | 1 | 0 | ◻ | | Telephone/fax code for country code USV is not maintained | |
| 7 | 0 | 0 | | | | Mr., Franz,.... |
| 8 | 0 | 0 | | | | Mr., Josef,.... |
| 9 | 0 | 0 | | | | Mr., Winfri... |
| 10 | 0 | 0 | | | | Mr., Johan... |

METHOD, COMPUTER PROGRAM PRODUCT AND DEVICE FOR IMPORTING A PLURALITY OF DATA SETS INTO A SYSTEM

PRIORITY CLAIM

This application claims priority from European Patent Application No. 04009849.3-2201, filed Apr. 26, 2004, the contents of which are incorporated herein by reference.

TECHNICAL FIELD

The present invention relates to a method, a computer program product and a device for importing a plurality of data sets into a system.

BACKGROUND

It is known to import external data into systems by using data files. In particular, a plurality of files is used from which the data to be imported into the system is read and into which said processed data is written. However, the handling of these files is not convenient and time consuming.

SUMMARY

It is therefore an object of the present invention to provide a method, a computer program product and a device for importing a plurality of data sets into a system, which enable a convenient and highly perfomant importing of data sets.

This object is solved according to the present invention by a method for importing a plurality of data sets into a system having the features disclosed in claim 1, a computer program product for importing a plurality of data sets into a system having the features disclosed in claim 10, and a device for importing a plurality of data sets into a system having the features disclosed in claim 11. Preferred embodiments are subject of the dependent claims.

According to the present invention, there is provided a method for importing a plurality of data sets into a system, each data set comprising data segments separated by a separator, the method comprising the steps of:
  providing data sets to be imported on a data storage medium;
  reading said data sets from said data storage medium;
  storing said data sets in a first table in said system, substantially without processing said data sets;
  reading said stored data sets from said first table, preferably data set by data set; and
  writing one or more data segments of each data set into sub-tables, each sub-table comprising at least one data field, said data field being preferably associated with predefined categories.

The data segments preferably each contain different values of different categories.

The separator is preferably a comma, semicolon, tab, or any other suitable character or sign.

The storage medium can be a disc or any other suitable data storage. Furthermore, the data sets contained in a data file can be received e.g. by email. The data file can be stored in the system before being imported into the system.

During the step of writing preferably a step of mapping is executed.

In a preferred embodiment, the step of writing said data segments into sub-tables comprises the steps of substituting a predefined value of a data segment by another predefined value and writing said another predefined value into a data field of one of said sub-tables. A so called "value mapping" is preferably carried out in this step.

The step of writing said data segments into sub-tables can furthermore comprise the step of introducing a predefined value into a data field of one of said sub-tables preferably for all data sets, said predefined value being given by properties of the imported data sets and/or data file. A so called "constant mapping" is preferably carried out in this step.

Preferably the method comprises a step of inputting additional information relating to said data sets. Such information can be an ID of the data file and/or imported data, the origin and type of the data. Furthermore, the costs, permitted number of uses or permitted end of use date, recommended end of use data, gross number of the data can be input.

Preferably the method comprises a step of inputting the type of separator used.

Moreover, the method can comprise the step of updating a status of the data sets in a status-table. In particular, if the data sets are processed to performed processing steps can be stored and updates in the status-table.

The method furthermore preferably comprises the step of tracking erroneous data sets and marking said erroneous data sets in an error table.

The method can further comprise the step of checking whether two substantially identical data sets are present among the imported data sets. In this step a so called "duplicate check" can be carried out.

Preferably the method further comprises the step of checking whether the predefined properties of said data are correct. Such a check is preferably perform by comparing data segments of a data set with reference data.

Furthermore, according to the present invention there is provided a computer program product for importing data sets into a system comprising program parts for carrying out a method according to the present invention or preferred embodiments thereof.

Moreover there is provided a device for importing data sets into a system, said data sets being stored on a storage medium, each data set comprising data segments separated by a separator, said device comprising:
  a reading means for reading said data sets from said data storage medium;
  a first table for storing said read data sets substantially without processing said data sets;
  reading said stored data sets from said first table; and
  a plurality of sub-tables, each sub-table comprising at least one data field for storing one or more data segments of each data set.

Further features and advantages will become apparent from the following detailed description of preferred embodiments of the present invention with reference to the drawings.

BRIEF DESCRIPTION OF THE DRAWINGS

FIGS. 3A-3H show screen-shots of a user interface for operating the table structure.

DESCRIPTION

Figure 1:
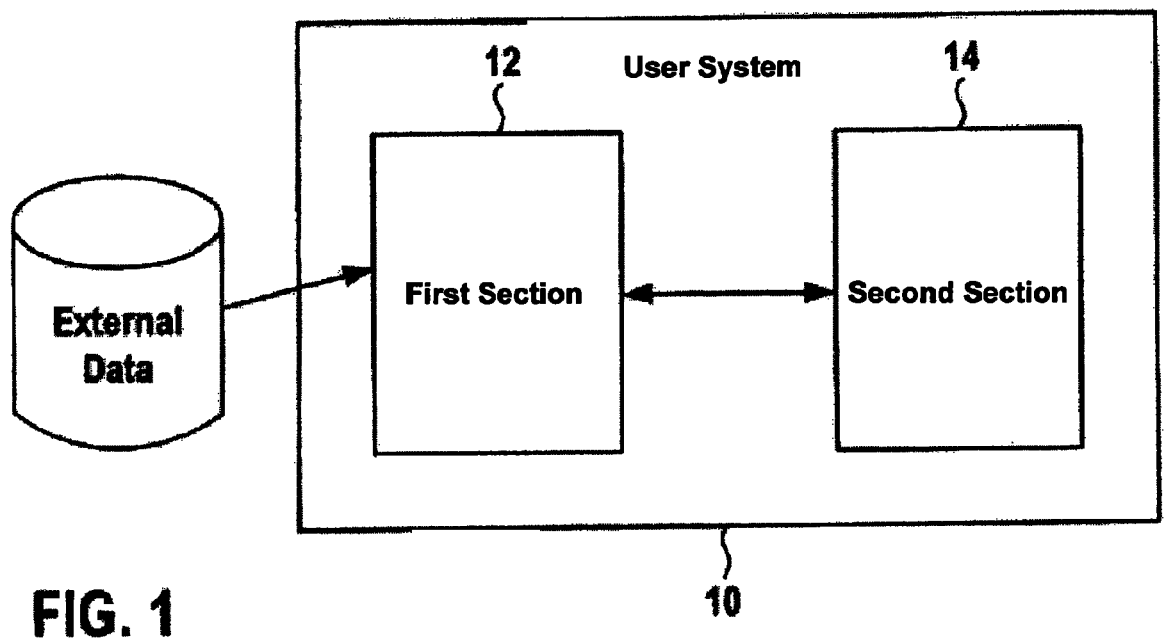
FIG. 1 schematically shows a system for importing an processing data.

A user system 10 for importing an processing data is schematically shown in FIG. 1. The user system 10 comprises a first section 12 which can be used for importing and processing external data. The user system furthermore comprises at least one second section 14 in which data contained in the user system is processed.

A table structure and method for importing and processing large amounts of data sets into said user system 10 will be described in the following. As a preferred embodiment, the importing and processing of address data in a system will be described hereinafter.

External data comprising a plurality of data sets to be imported into a system are provided on an electronic storage medium, like a CD, or are received via ISDN, email, and so on. The data sets are provided in a predefined format in a data file e.g. ASCII, Excel, or dBase. The data sets comprise data segments of different categories. For address data such categories could be first name, last name, street, house number, city, etc. The segments of a data set are separated by a separator in the data file. The separator can be e.g. comma, semicolon, tab or any other character.

Figure 2:
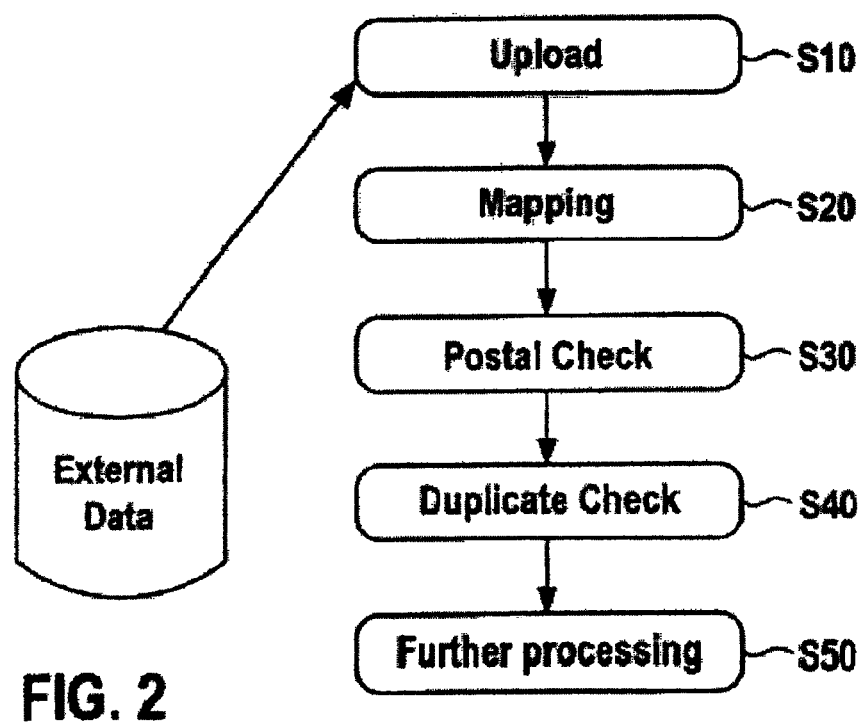
FIG. 2 shows a schematic overview of a method of uploading and processing data in a preferred table structure.

FIG. 2 shows a schematic overview of a method of uploading and processing data in a preferred table structure.

External data to be imported into the system are first uploaded without any further processing (step S10). The data sets uploaded in the user system are referred to as "data list". The uploaded data sets are mapped (step S20). In particular the data structure of the uploaded data sets is transferred to the data structure of the system (to be described later). After mapping the data sets several checks are performed on the data sets in order to verify if particular properties of the data sets are correct. In the present case, as address data sets are used, a postal check (step S30) and a duplicate check (step S40) are performed. In the postal check it is verified whether the address data provided is correct with respect to general properties, e.g. it is checked whether the postal code correctly corresponds to the city given in one data set.

During the duplicate check step, it is checked whether duplicate data sets, i.e. substantially identical data sets or data sets having a specified (predetermined or predeterminable) range of identical data fields are present. During this check it can be verified whether a newly imported data set is substantially identical to a data set already present in the system or whether two newly imported data sets are identical. The duplicate check can e.g. be performed by comparing the components of the one data set (last name, first name, street, . . . ) with the same components of another data set.

After having performed the various checks, the imported data sets can be further processed (step S50) as will be described later.

In the following, a table structure used for importing and processing data and/or data sets will hereinafter be referred to as a "staging area".

The staging area comprises a plurality of tables into which data segments of the imported data sets and/or additional information relating to the data list is written.

The external data stored on a data storage medium is read line by line (data set by data set) and stored in table CRMD_MKTLIST_C. During this step, the data is not processed in any way. This means that in CRMD_MKTLIST_C the data is stored in a form similar to the form of the provided data in the data file. The data segments separated by the separator are written into the table CRMD_MKTLIST_C substantially without an processing. Thus the data sets as a whole are transferred from the data storage medium to the table CRMD_MKTLIST_C without being split up into separate parts.

The data stored in CRMD_MKTLIST_C is then mapped. During the mapping step the data sets stored in CRMD_MKTLIST_C are each divided up, whereby one or more segments of each data set are stored e.g. in either of tables CRMD_MKTLIST_ADR, CRMD_MKTLIST_ORG, CRMD_MKTLIST_PER, CRMD_MKTLIST_CEN. In CRMD_MKTLIST_ADR data segments of each data set relating to address properties (e.g. street, postal code, city, . . . ) of the data sets are stored. In CRMD_MKTLIST_ORG data segments of each data set relating to the data set's organizational properties (e.g. company name, . . . ) are stored. In CRMD_ MKTLIST_PER data segments of each data set relating to the person (e.g. first name, last name, age, sex, . . . ) are stored. In CRMD_MKTLIST_CEN data segments of each data set relating to containing additional information (e.g. contact person of a company, . . . ) are stored.

If the data sets relate to other types of data, other suitable tables can be used.

A table CRMD_MKTLIST_E is provided in which error messages for errors which occur during the processing of the data are logged.

Furthermore, there is provided a plurality of tables which form a so called "administrative area". In the present system the following tables are provided:

CRMD_MKTLIST_H
CRMD_MKTLIST_T
CRMD_MKTLIST_PH
CRMD_MKTLIST_S
CRMD_MKTLIST_L
CRMD_MKTLIST_I

In CRMD_MKTLIST_H header information and attributes (e.g. origin of the data, type of the data, costs) relating to the list are stored. In CRMD_MKTLIST_T additional information (e.g. short description, language dependent) relating to the list is stored. In CRMD_MKTLIST_PH package header information and attributes is stored, e.g. the mapping format used or the name of the provided file containing the data sets to be imported. In CRMD_MKTLIST_S the steps which have already been processed for a specific data list are indicated. In CRMD_MKTLIST_L builds the connection between the header and the list itself. In particular a reference to CRMD_MKTLIST_H is stored in this table. In CRMD_MKTLIST_I a link or reference to a created data object (to be described later) is stored for each data set.

In the following, examples of the above mentioned tables are shown:

| Header table CRMD_MKTLIST_H | | |
|---|---|---|
| Field | Data type/-element | Meaning |
| CLIENT | MANDT | Client |
| LIST_GUID | RAW16 | GUID of the list |
| LIST_ID | CHAR28 | ID of the list |
| LIST_ID_LOGSYS | CHAR10 | Logical system where the list was created |
| ORIGIN | CHAR6 | Origin of the list |
| TYPE | CHAR2 | Type of the list (bought, rented) |
| VALID_DATE_TO | DATS8 | Recommended End-of-Use Date |
| MAX_USAGE_NO | NUMC4 | Permitted No. of Uses for Address List |
| MAX_USAGE_DATE | DATS8 | Permitted End-of-Use Date |
| NO_GROSS | NUMC8 | Gross number |
| COSTS | CURR15 | Costs |
| COSTS_CURRENCY | CUKY5 | Currency of costs |
| CREATED_AT | DEC15 | Creation date |
| CREATED_BY | CHAR12 | Creation user |
| CHANGED_AT | DEC15 | Change date |
| CHANGED_BY | CHAR12 | Change user |
| DELETED | CHAR1 | Flag which indicates that list is deleted |
| APPL_LOG_ID | CHAR22 | ID of application log of deletion |

| Item table CRMD_MKTLIST_I | | |
|---|---|---|
| Field | Data type/-element | Meaning |
| CLIENT | MANDT | Client |
| ITEM_GUID | RAW16 | GUID of the line |
| LIST_GUID | RAW16 | GUID of the list |
| BP_GUID_ORG | RAW16 | GUID of the assigned business partner (type organization) |
| BP_GUID_PER | RAW16 | GUID of the assigned business partner (type person) |
| POSTAL | CHAR1 | Flag that the entry has postal errors |
| DUPLICATE | CHAR1 | Flag that the entry is a duplicate |

| Text table CRMD_MKTLIST_T | | |
|---|---|---|
| Field | Data type/-element | Meaning |
| CLIENT | MANDT | Client |
| LIST_GUID | RAW16 | GUID of the list |
| LIST_LG | LANG1 | Language |
| LIST_DESCR | CHAR60 | Description |

| Header table CRMD_MKTLIST_PH | | |
|---|---|---|
| Field | Data type/-element | Meaning |
| CLIENT | MANDT | Client |
| PACKAGE_GUID | RAW16 | GUID of the package |
| SET_GUID | RAW16 | GUID of the profile set |
| SET_DESCRIPTION | CHAR72 | description of a profile set |
| EXISTING_SET | CHAR1 | |
| PF_GUID | RAW16 | GUID of a profile |
| TG_GUID | RAW16 | GUID of the target group |
| TG_DESCRIPTION | CHAR72 | description of a target group |
| MAPPING_FORMAT | CHAR6 | format of an external list |
| SEPARATOR_TYPE | CHAR1 | Field separator type |
| SEPARATOR_CHAR | CHAR1 | Field separator character |
| FILE | CHAR255 | Location of the file |
| FILE_STORAGE | CHAR1 | Storage place of file: workstation or server |

| Package-List-Assignment table CRMD_MKTLIST_L | | |
|---|---|---|
| Field | Data type/-element | Meaning |
| CLIENT | MANDT | Client |
| PACKAGE_GUID | RAW16 | GUID of the package |
| LIST_GUID | RAW16 | GUID of the list |

| Package-Workflow-Steps-Assignment table CRMD_MKTLIST_S | | |
|---|---|---|
| Field | Data type/-element | Meaning |
| CLIENT | MANDT | Client |
| PACKAGE_GUID | RAW16 | GUID of the package |
| STEP | CHAR1 | Step (U, M, P, D, B, T, C, R) |
| FLAG | CHAR1 | flag, which indicates that step is selected |
| STATUS | CHAR1 | defines, what the process status of the step is (active, finished or error) |
| ATTR_ERROR | CHAR1 | Determines, what the workflow has to do, if the step has an error (break or continue) |
| REPEAT_ALL | CHAR1 | Determines: wants the user to repeat the step for all entries in the list or only for the failed, if in the step occurs an error |
| APPL_LOG_ID | CHAR22 | Application Log: Handle of a protocol |

A graphical user interface for operating the staging area will be described with reference to FIGS. 3A to 3H.

The user interface comprises a field 30 for inputting an ID of a list to be created and a field 32 for inputting a description of the list. Furthermore, the user interface comprises a plurality of tab strips 34-42 for selecting specified input screens described hereinafter.

FIG. 3A shows a basic screen for inputting basic data relating to the data file to be uploaded.

If the user wants to upload a new data file he must create a new data list. The user enters an ID of the data list in field 30 (in the present case: PERSON_LIST) and a description of the list in field 32. On tab strip 32 the user enters or can enter attributes such as the origin in field 44, the type in field 46, the costs in field 48, the permitted number of uses in field 50 or permitted end of use date in field 52 (if the data sets can only be used for a predefined number of times and/or a predefined usage period, to be described later), recommended end of use date in field 54 and/or the gross number in field 56 (=number of expected data sets in the file). This information input in region 62 is stored in tables CRMD_MKTLIST_H and CRMD_MKTLIST_T.

Furthermore, the user enters the file name (with complete path) in field 58 and the field separator used in the data file to be imported (comma, semicolon, tab, other character) in field 60. A so called "package" is created and the information input in region 64 is stored in table CRMD_MKTLIST_PH.

Figure 3B:
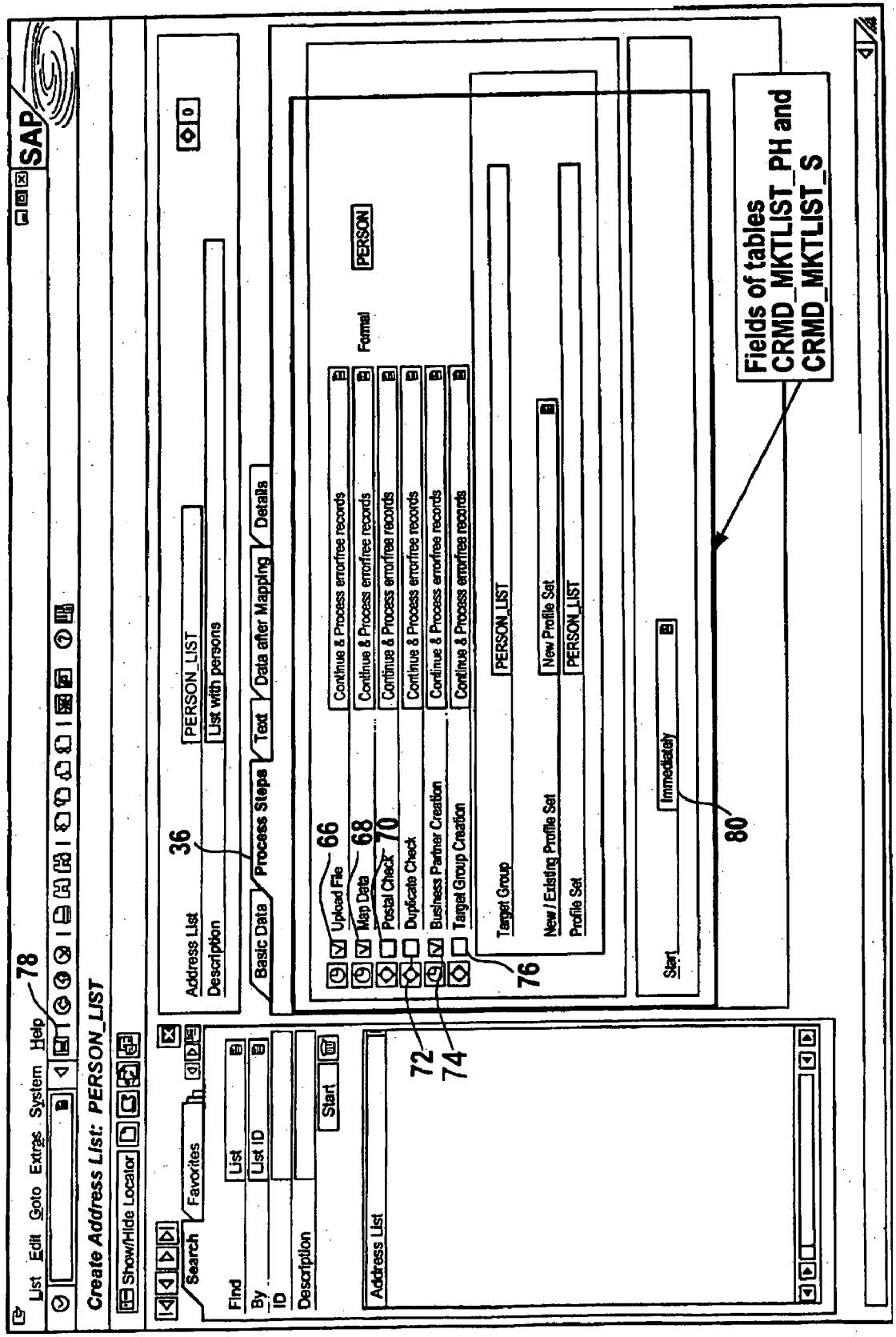

FIG. 3B shows a screen for inputting information relating to process steps to be performed.

On tab strip 36 the user can mark in the fields 68-74 the steps or processing that should be processed within one background job, i.e. in one run. In the shown screen, the user can select one, several or all of 'Upload File' (field 66), 'Map Data' (field 68), 'Postal Check' (field 70), 'Duplicate Check' (field 72), and two steps for further processing (fields 74, 76) ('Business Partner Creation' and 'Target Group Creation').

If the step 'Map Data' (field 68) is marked a mapping format must be given (to be described later).

The user can specify in field 80 the start type, i.e. whether the processing is to start immediately or at a specified later time.

If the user presses the save button 78, the entered data is saved.

The input data is then written into tables CRMD_MKTLIST_PH and CRMD_MKTLIST_L by the system. Table CRMD_MKTLIST_S contains all steps for the package, wherein the status of every step is initial.

Figure 3C:
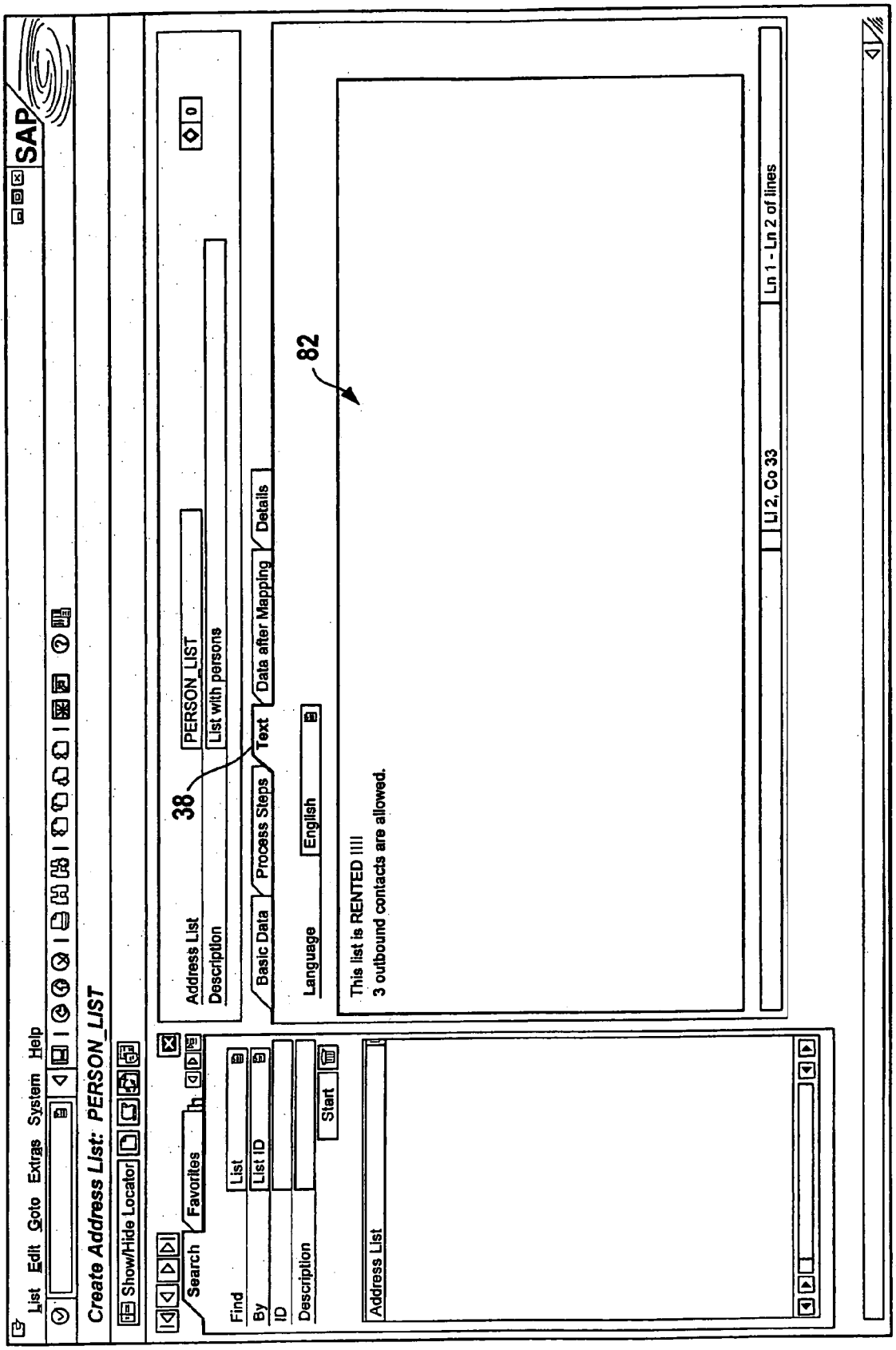

FIG. 3C shows a screen for inputting additional information relating to the list to be imported. On tab strip 38 there is provided a field 82 into which the user can enter a long text.

In the following several examples for processing are given.

The user marks the upload step (field 66), gives a start date/time (field 80) and saves the list (button 78). The file is read from application server and its content is stored in table CRMD_MKTLIST_C. in particular the data sets stored in the data file are read data set by data set and written into table CRMD_MKTLIST_C.

In table CRMD_MKTLIST_S the status of step U ('upload') is updated. If errors occur the step can be repeated. In that case only those data sets of the file are processed which were not transferred to CRMD_MKTLIST_C earlier. If the step was processed without any error it cannot be repeated again.

The user marks the mapping step (field 68), gives a start date/time (field 80) and saves the list (button 78). Once the input by the user is terminated and/or the start time is reached, the processing starts. The previously uploaded data is read from table CRMD_MKTLIST_C data set by data set, mapped and stored in the other tables of the staging area:

CRMD_MKTLIST_ORG
CRMD_MKTLIST_PER
CRMD_MKTLIST_ADR
CRMD_MKTLIST_CEN

In particular, an iterative processing takes place in which respective data segments of each data set are read and subsequently written into one of the above tables.

In table CRMD_MKTLIST_S the status of step M ('mapping') is updated. In table CRMD_MKTLIST_I the items are inserted. If errors occur the step can be repeated for all data sets or only for the erroneous. At start of the repetition for all data sets the entries in CRMD_MKTLIST_E, CRMD_MKTLIST_ADR, CRMD_MKTLIST_ORG, CRMD_MKTLIST_PER and CRMD_MKTLIST_CEN are deleted for the repeated data sets. New entries in CRMD_MKTLIST_E, CRMD_MKTLIST_ADR, CRMD_MKTLIST_ORG, CRMD_MKTLIST_PER and CRMD_MKTLIST_CEN are created during the processing. The entries in CRMD_MKTLIST_I are updated only.

In case of repetition for erroneous data sets, only those data sets that are marked as erroneous (in table CRMD_MKTLIST_E) and those data sets that were not processed in previous execution are processed again. Entries in CRMD_MKTLIST_E are deleted just before creating new entries.

The user marks the step for postal check (field 70), gives a start date/time (field 80) and saves the list (button 78). Once the input by the user is terminated and/or the start time is reached, the processing starts. The previously mapped data is read from tables of the staging area

CRMD_MKTLIST_ORG
CRMD_MKTLIST_PER
CRMD_MKTLIST_ADR
CRMD_MKTLIST_CEN and checked against postal reference data. In table CRMD_MKTLIST_S the status of step P ('Postal Check') is updated. In table CRMD_MKTLIST_I the items are updated, field POSTAL is filled. This step is optional for the processing of the data.

If errors occur the step can be repeated for all data sets s or only for the erroneous. At start of the repetition the entries in CRMD_MKTLIST_E are deleted for the repeated data sets. New entries in CRMD_MKTLIST_E are created during the processing. The entries in CRMD_MKTLIST_I are updated only.

The user marks the step for duplicate check (field 72), gives a start date/time (field 80) and saves the list (button 78). Once the input by the user is terminated and/or the start time is reached, the processing starts. The previously mapped data is read from tables of the staging area

CRMD_MKTLIST_ORG
CRMD_MKTLIST_PER
CRMD_MKTLIST_ADR
CRMD_MKTLIST_CEN and checked if data sets of the lists exist already as business partner in the system. In table CRMD_MKTLIST_S the status of step D ('Duplicate Check') is updated. In table CRMD_MKTLIST_I the items are updated, field DUPLICATE is filled. This step is optional for the processing of the data.

If errors occur the step can be repeated for all data sets or only for the erroneous. At start of the repetition the entries in CRMD_MKTLIST_E are deleted for the repeated data sets. New entries in CRMD_MKTLIST_E are created during the processing. The entries in CRMD_MKTLIST_I are updated only.

Figure 3D:
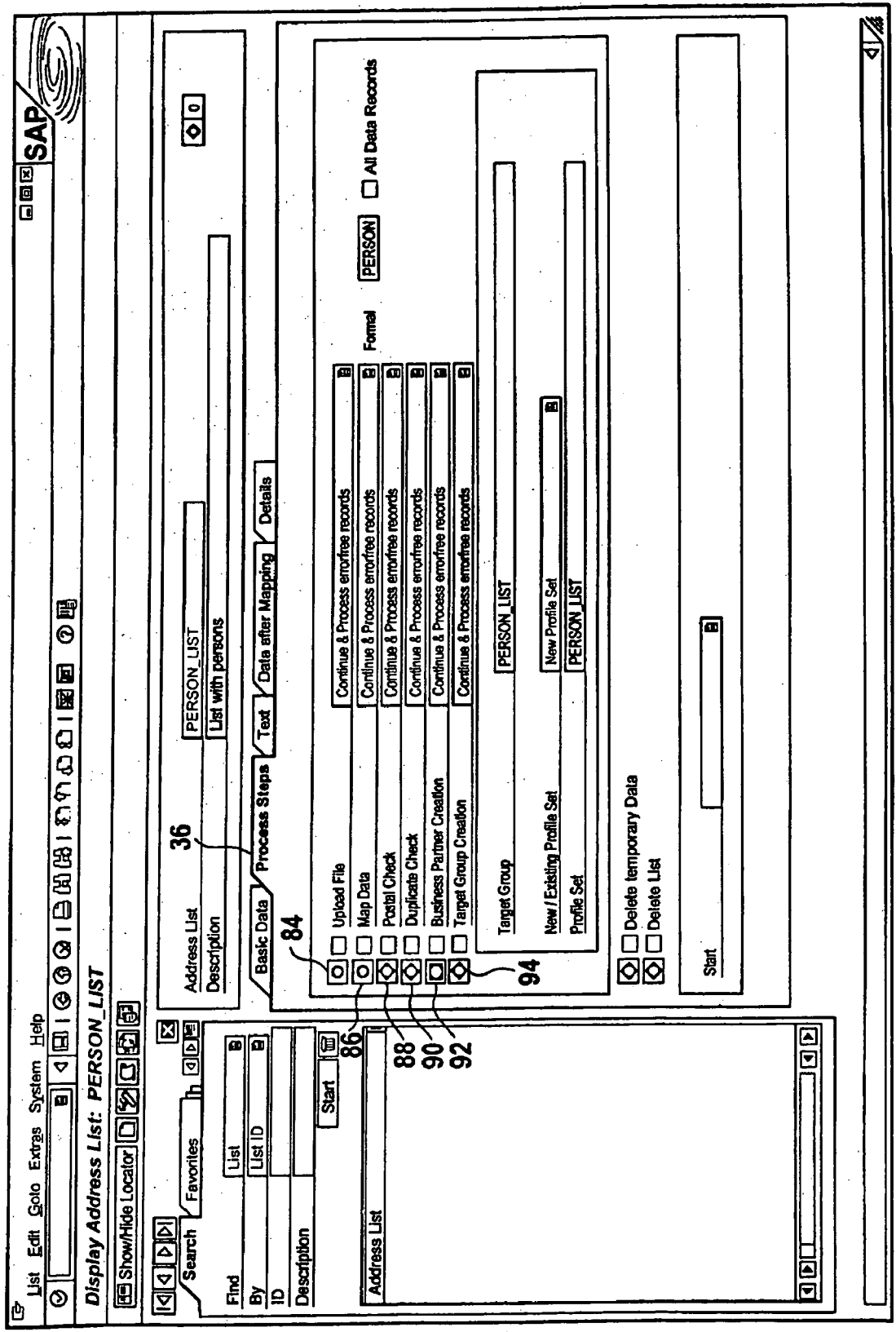

FIG. 3D shows a corresponding to the screen shown in FIG. 3B after the processing of the data has taken place in which tab strip 36 is visible.

After the marked steps are processed a traffic light 84-92 shows if errors occurred. By pressing the button associated with the traffic light 84-92 a popup window with detailed messages appears (see e.g. FIG. 3F).

The processing of the steps can be repeated, the user must mark the step again. For some steps the user can mark a second flag 94. If this flag 94 is marked all data sets are processed again, otherwise only the erroneous data sets are processed again.

A summary log with status information of all processed steps can be opened by pressing the log button 96 (see FIGS. 3A and 3E).

FIG. 3E shows a summary log about status information of all processed steps and FIG. 3F shows a popup with detailed error information of a selected step.

Figure 3G:
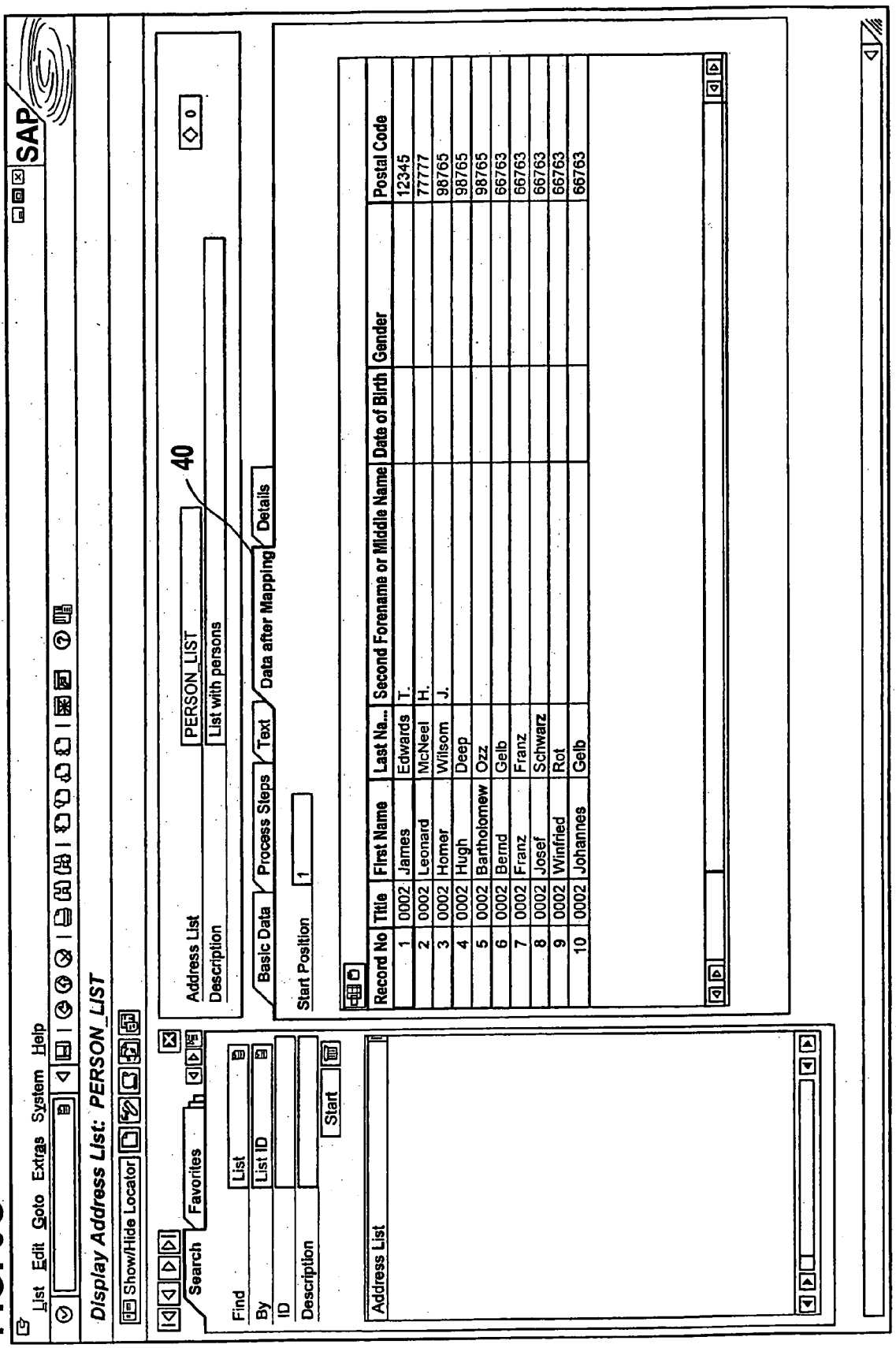

FIG. 3G shows a screen with the tab strip 40. After the step 'Map Data' (to be described later in detail) is processed the result can be checked on this tab strip 40.

Figure 3H:
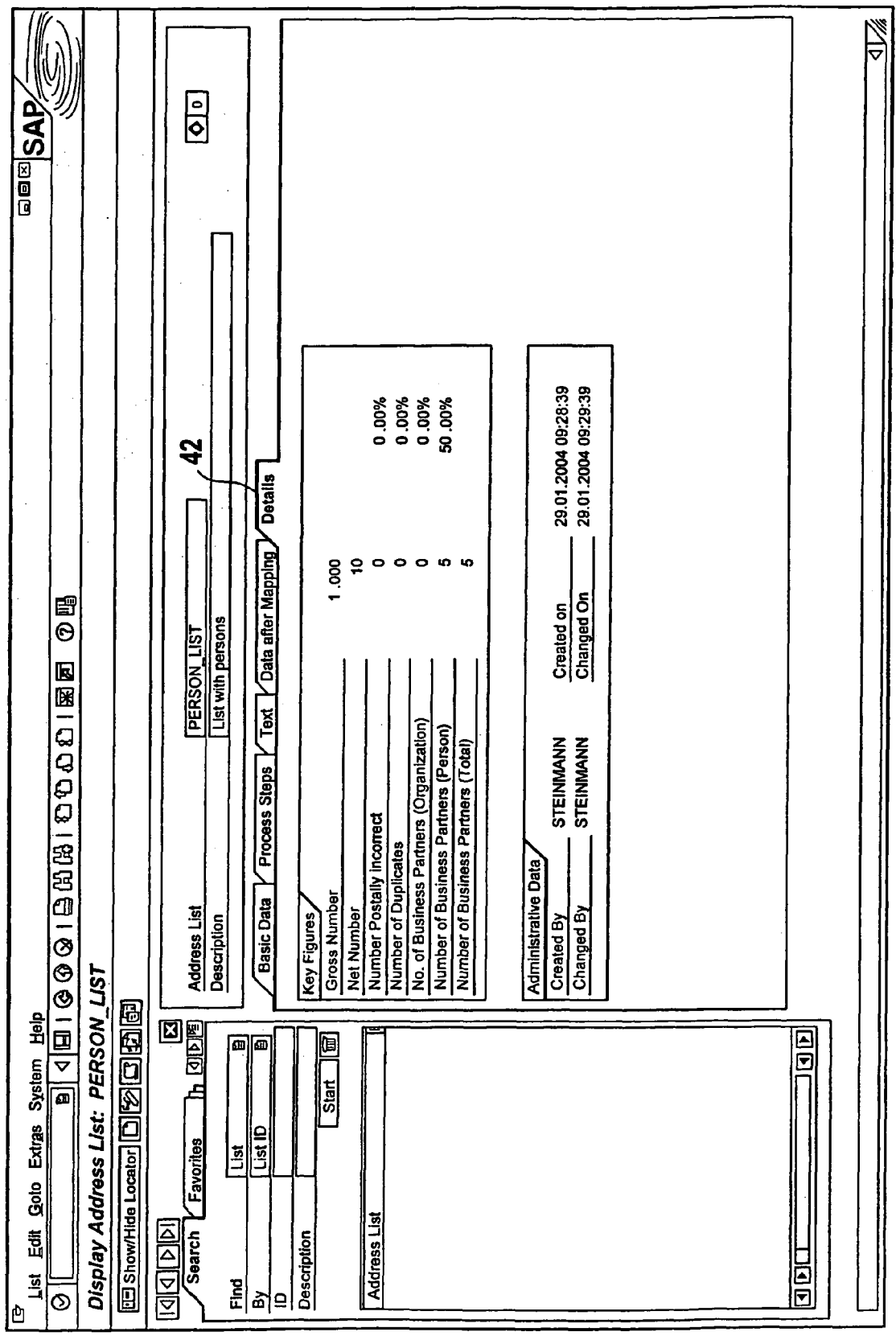

In FIG. 3H shows a screen with the tab strip 42. Here some key figures and administrative data are shown.

The processed data stored in the tables of the staging area can be use used in the user system for creating data objects for each data set. These data objects can then be further processed in the user system.

If a data object is created for a data set, a reference to the created data object is stored in the table CRMD_MKTLIST_I. The created data object is preferably stored centrally in the user system to be accessible for a plurality of applications. Table CRMD_MKTLIST_I establishes a link between the data sets stored in the staging area and the centrally stored data object.

In the following a User Interface for mapping the read data sets stored in table CRMD_MKTLIST_C will be described with reference to FIGS. 4A to 4D. FIGS. 4A to 4D show screen-shots of a graphical user interface provided for the mapping function.

Before a data list can be mapped a mapping format must be defined.

Figure 4A:
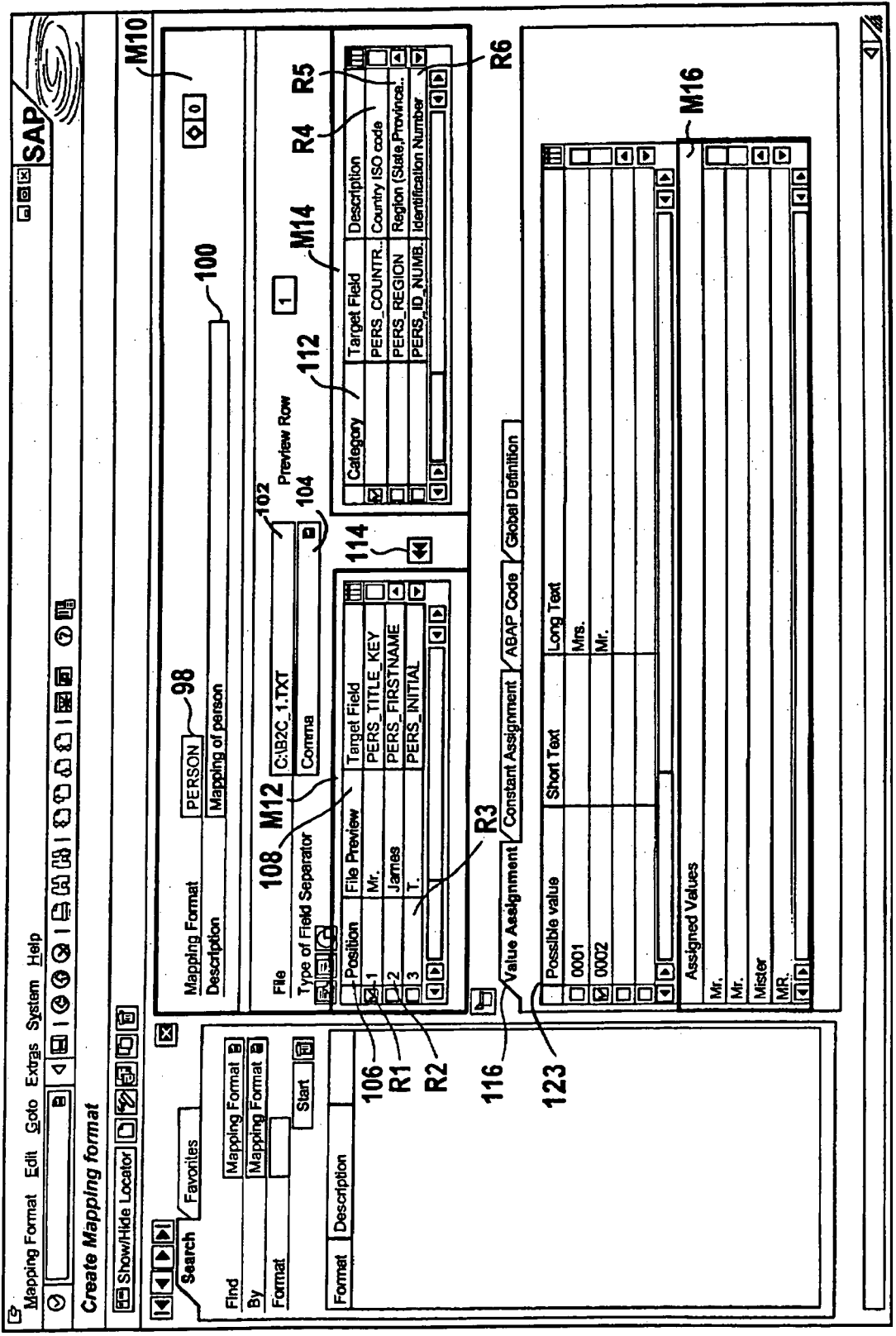
FIGS. 4A-4D show screen-shots of a user interface provided for a mapping function.

FIG. 4A shows a screen in which the user can edit some or more mapping features.

In the general section M10 there is provided a field 98 for inputting an ID of a mapping format to be used. A predefined mapping format previously stored can be used. Alternatively, a new mapping format can be created or an existing mapping format can be edited. Furthermore, in the field 100 a text description of the mapping format can be entered.

The file name of the imported file is entered in the filed 102. Furthermore, the type of field separator is to be chosen in field 104.

Moreover, there are table controls M12 and M14 placed side to side. The table control M12 on the left (segment display section) has three fields 106, 108, 110 in which a position (column number of data segment in the imported file), a file preview (data segment of one data set in the file) and/or the target field name which indicates the target field to which the respective data segment is to be associated are displayed, respectively.

When creating a new mapping format this table control M12 is empty. When the data file for which the mapping format is to be used is selected, the file contents is read depending on the file separator selected. If a correct separator is selected the data is read and shown to the user in table control M12 with each row R1, R2, R3 in the table control M12 showing individual column values (data segments) of one data set of the data file in field 108. Since its only a preview, the first line of the data set is read and placed in the table control M12. If the user had chosen an invalid separator, the whole data set (first line) is shown in one single row (the first row R1 of the table control M12).

The table control M14 on the right (target display section) shows possible target fields defined in the staging area and their description. In the left table control M12 for every column (position) in the file a target field can be assigned in field 110.

A category column (field 112) appears in this control M14, which clearly demarcates the target fields which belong to an organization, organization address, person, person address and contact person function, in the case if address data are used. In case other types of data are used, other specifications can be given for the target fields. This table control displays only target fields.

Since now the user knows the file content for which the mapping has to be done, he can choose the target field by marking one of rows R4-R6 on the table control M14 and the source field by marking one of rows R1-R3 on the table control M12) and press the move button 114 which appears between these controls M12, M14.

Some target fields only allow predefined values defined in a customizing table. For those target fields a value mapping can be defined as will be described hereinafter. For the value assignment the tab 116 is provided.

As shown in FIG. 4A, for the data segment "PERS_TITLE_KEY", i.e. the title of the person, in the user system the values 0001 and 0002 are provided (column 123), 0001 representing "Mrs." and 0002 representing "Mr.". In the data sets provided, e.g. the title of a person is indicated by the usual expressions Mrs. and Mr. Therefore, these usual expressions need to be substituted by the values used in the user system when importing the data sets into the user system.

Moreover, it is possible to assign a plurality of expressions used in the imported data sets to a specified (predetermined or predeterminable) value in the user system. A table control M16 is provided where the user can assign multiple values to the possible values of the mapped field. In the present example, the expressions "Mr.", "Mr", "Mister" and "MR" are all assigned to the value 0002 representing "Mr." in the user system.

Furthermore, there can be provided a field in which all possible values of a particular data segment of all data sets of a file for which value mapping is to be provided are displayed (not shown in FIG. 4A). Thus, the user can see all possible expressions used in the data file and assign these respectively to the values given in the user system.

Figure 4B:
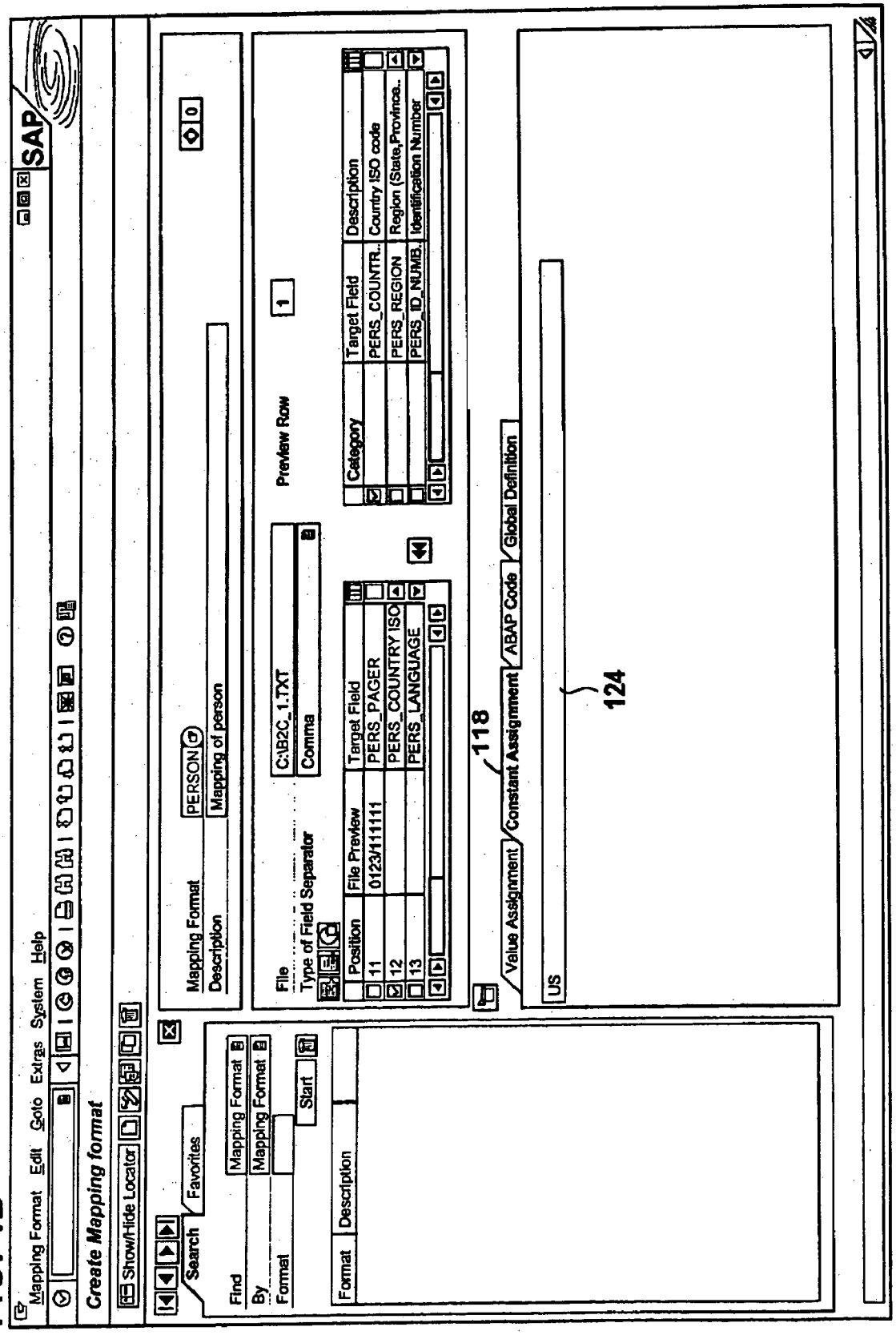

FIG. 4B shows a screen corresponding to the screen of FIG. 4A, wherein the tab 118 is visible.

For those target fields that should have the same value for all data sets in the file a constant assignment can be defined.

The constant assignment can be used if all data sets of the data list should have the same value for a particular field. For example a data list has data sets only from the United States but the country information is not part of the file. The country field is assigned to the mapping format and the constant value US is assigned to this field.

On tab strip 118 in field 124 the user can input the constant value to be assigned to all data sets.

Figure 4C:
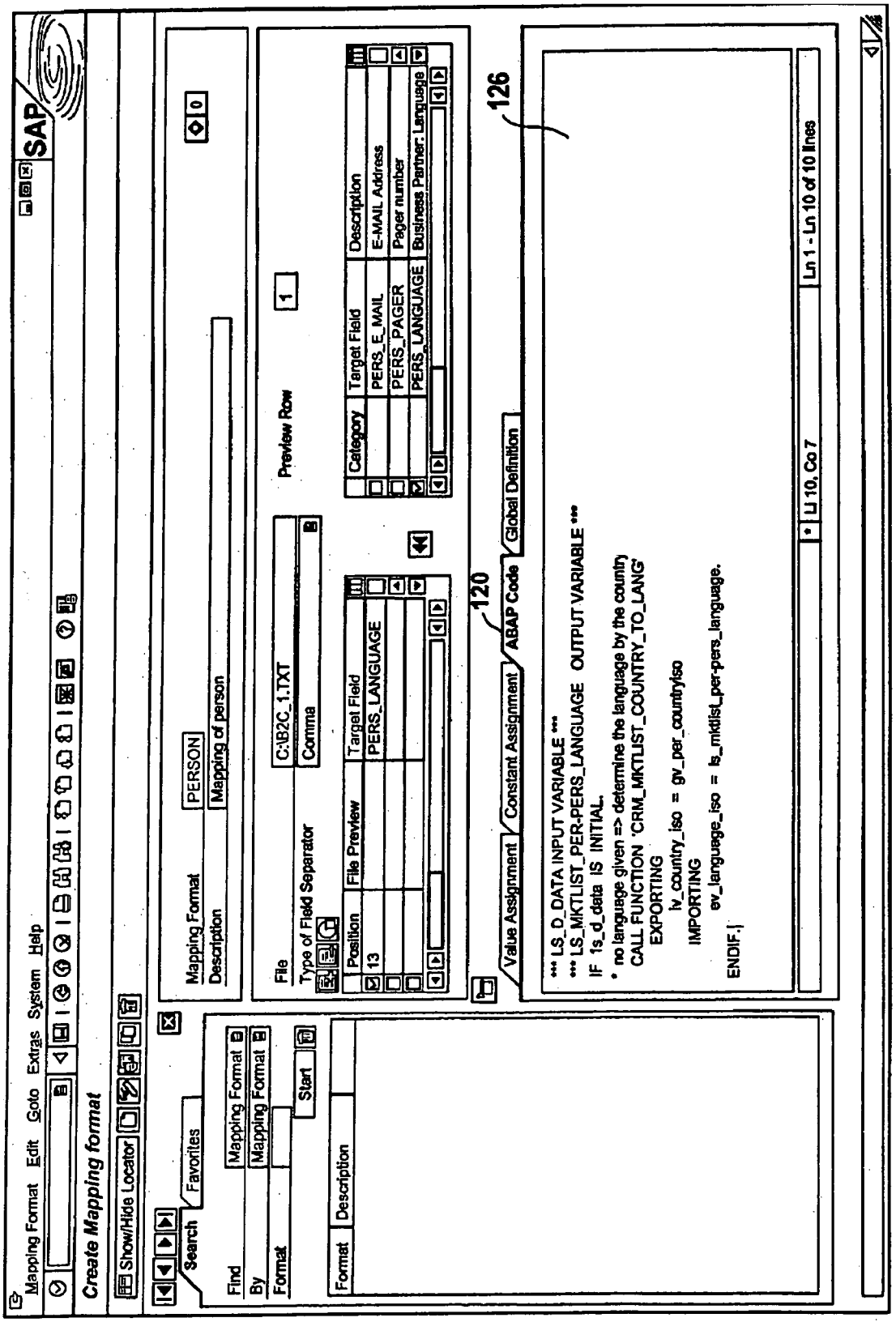

FIG. 4C shows a screen corresponding to the screen of FIG. 4A, wherein the tab 120 is visible.

For those target fields that need a more complex mapping algorithm, a code can be programmed in field 126. In the shown user interface a so called "ABAP code" (Advanced Business Application Programming) can be defined.

The user interface does not allow the user to select this tab 120 unless and until the user selects a mapped field from the table control M14, which holds the mapping fields. Now, the user can see the names of the input structure and the output structure (this is like input parameter and output parameter of a function module). The user can write executable routines in ABAP Code for this mapping field in this control. Care must be taken that the values that come in, are always in the input parameter and the output after the conversion should be assigned to the output parameter.

In the present example, the file contains no column with language information. Via coding the language information is derived from the country information.

Figure 4D:
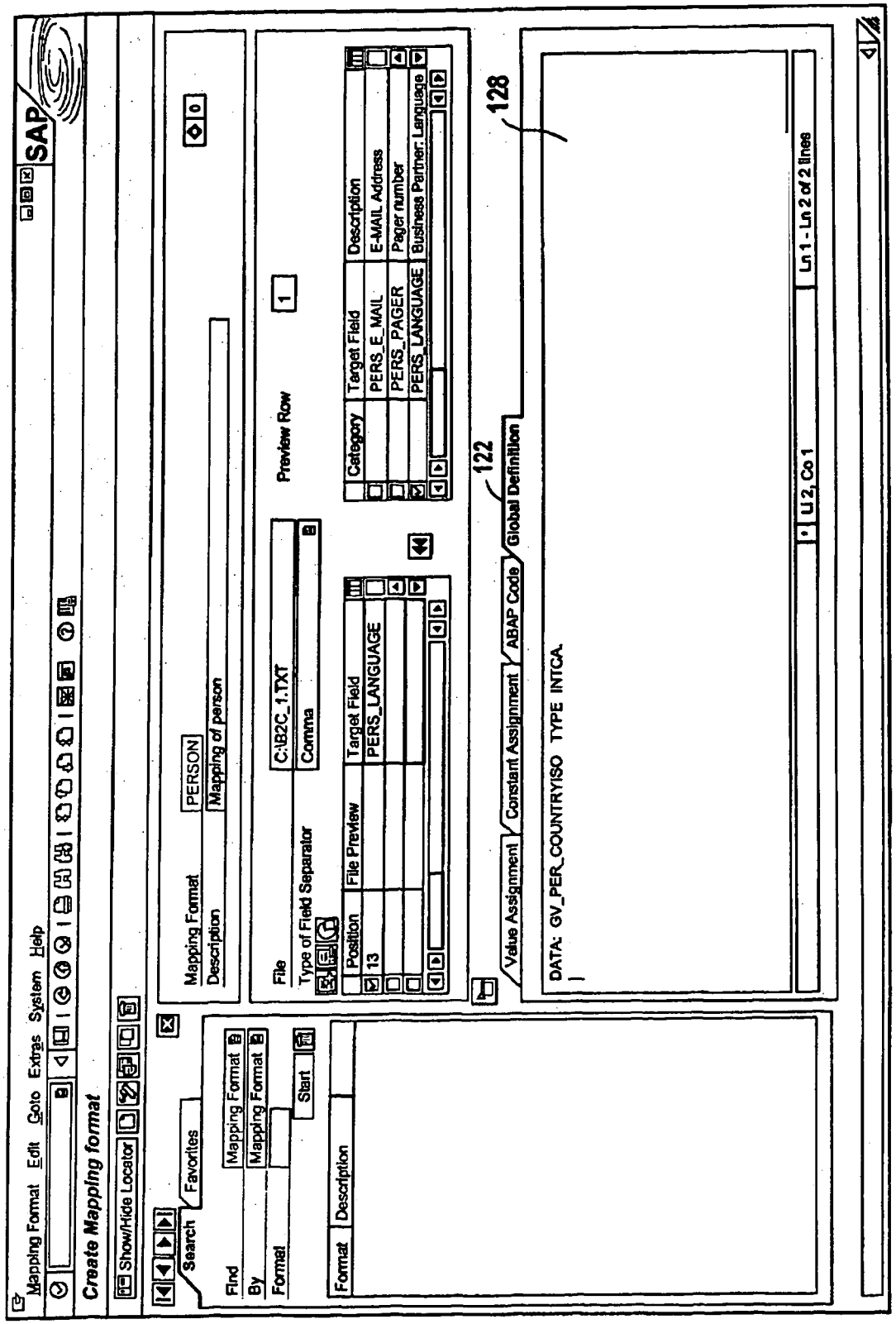

FIG. 4D shows a screen corresponding to the screen of FIG. 4A, wherein the tab strip 122 is visible.

If global variables are needed for the ABAP coding they can be defined in tab strip 122 in field 128.

The above description has been given for the importing and processing of address data set into a user system. However, other types of data can also be processes by the described structures. Such data could e.g. be measurement data which are to be evaluated in an evaluation system.

| List of Reference Numerals | |
| --- | --- |
| 10 | user system |
| 12 | first section |
| 14 | second section |
| 30 | field |
| 32 | field |
| 34-42 | tab strip |
| 44-60 | field |
| 62, 64 | region |
| 66-76 | field |
| 78 | save button |
| 80, 82 | field |
| 84-92 | traffic light |
| 94 | flag |
| 96 | log button |
| 98-112 | field |
| 114 | move button |
| 116-122 | tab strip |
| 124-128 | field |
| M10-M16 | table control |
| R1-R6 | row |

The invention claimed is:

1. A method for importing a plurality of data sets into a system, each data set comprising data segments separated by a separator, the method comprising the steps of:
   providing data sets to be imported on a data storage medium;
   reading said data sets from said data storage medium;
   storing said data sets in a first table in said system, without dividing any of the data sets, while preserving a form of the data sets as it said form exists in the data storage medium;
   reading said stored data sets from said first table; and
   writing one or more data segments of each data set read from said first table into sub-tables thereby dividing the data sets, each sub-table comprising at least one data field.

2. The method according to claim 1, wherein the step of writing said data segments into sub-tables comprises steps of substituting a predefined value of a data segment by another predefined value and writing said another predefined value into a data field of one of said sub-tables.

3. The method according to claim 1, wherein the step of writing said data segments into sub-tables comprises a step of introducing a predefined value into a data field of one of said sub-tables, said predefined value being given by properties of the imported data sets and/or data file.

4. The method according to claim 1, furthermore comprising a step of inputting additional information relating to said data sets.

5. The method according to claim 1, further comprising a step of inputting the type of separator used.

6. The method according to claim 1, further comprising a step of updating a status of the data sets in a status-table.

7. The method according to claim 1, further comprising a step of tracking erroneous data sets and marking said erroneous data sets in an error table.

8. The method according to claim 1, further comprising a step of checking whether two substantially identical data sets are present among the imported data sets.

9. The method according to claim 1, wherein said method further comprises a step of checking whether the predefined properties of said data are correct.

10. A device for importing data sets into a system, said data sets being stored on a storage medium, each data set comprising data segments separated by a separator said device comprising:
   a reading means for reading said data sets from said data storage medium;
   a first table for storing said read data sets without dividing any of the data sets, while preserving a form of the data sets as it said form exists in the data storage medium;
   a reading means for reading said stored data sets from said first table; and
   a mapping means for mapping data segments of the data sets read from the first table into a plurality of sub-tables, each sub-table comprising at least one data field for storing one or more data segments of each data set.

* * * * *